3,390,647
PRODUCTION OF PHARMACEUTICAL DOSAGE UNITS
William Evans, Welwyn Garden City, Hertforshire, England, assignor to Smith Kline & French Laboratories, Philadelphia, Pa., a corporation of Pennsylvania
Filed June 18, 1965, Ser. No. 464,961
Claims priority, application Great Britain, June 25, 1964, 26,378/64
6 Claims. (Cl. 107—54)

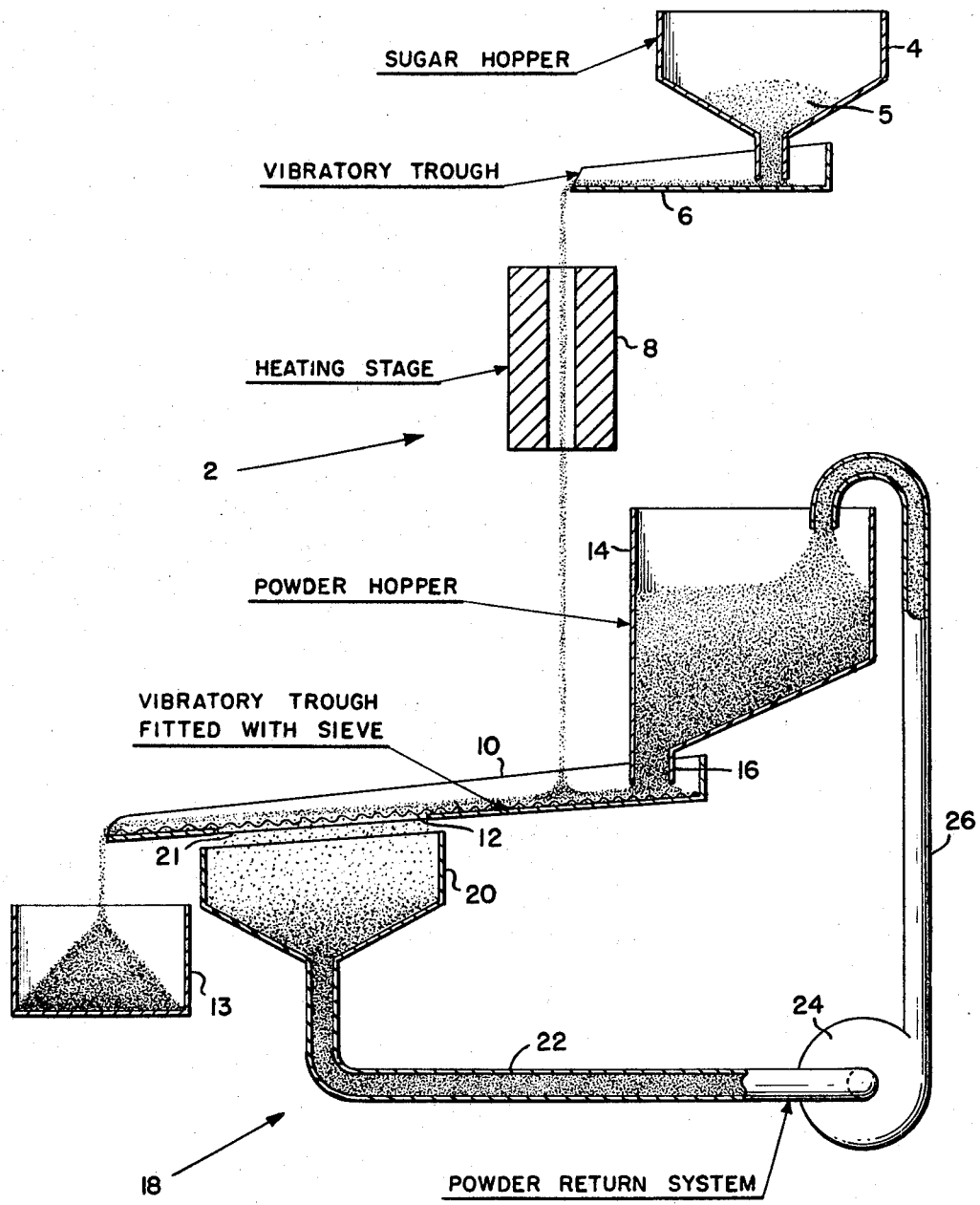

ABSTRACT OF THE DISCLOSURE

Process for preparing spherical cores by passing a fusible substance such as sugar through a heating zone and dropping the fused substance through air having a temperature lower than the solidification temperature of the fused substance in order to congeal as spherical cores.

---

This invention relates to the production of pharmaceutical compositions in dosage unit form and relates in particular to the production of pharmaceutical compositions in sustained release orally administrable dosage unit form, especially encapsulated sustained release pellets.

A standard procedure for preparing sustained release pharmaceutical pellets suitable for use in forming orally administrable dosage unit forms by, for example, encapsulating the pellets in hard gelatin capsules, consists of coating substantially spherical innocuous cores with a medicament, dividing the coated cores into a plurality of groups, coating the groups with a time delay coating so as to form pellets which will provide different times of release of the medicament on ingestion for each of said groups, combining the pellets and thereafter encapsulating the pellets.

The innocuous cores generally employed in the above procedure are sugar seeds, each of which normally consists of a granule of castor sugar surrounded by several layers each comprising starch and syrup so as to form a substantially smooth spherical seed.

The standard procedure for preparing the sugar seeds consists of placing a quantity of castor sugar into a rotatable coating pan, spraying the sugar crystals with syrup and starch whilst rotating the pan, and repeating the spraying with syrup and starch until the sugar crystals have been converted into spherical seeds having a diameter of, for example, 0.020 to 0.035 inch. This known procedure is a slow and tedious process taking several hours.

It is an object of the present inventon to provide a relatively cheap and easy method of preparing substantially spherical cores which may be used in the manufacture of sustained release pharmaceutical pellets.

It has now been found in accordance with the invention that substantially spherical cores suitable for use in the manufacture of sustained release pellets can be produced by fusing a fusible substance in a heating zone and allowing small droplets of the fused substance to fall under gravity in order to cool and thereby solidify. The resulting solidified cores may advantageously be allowed to drop into a shallow bed of powdered nontoxic material, such as a material commonly used as a carrier or excipient in the pharmaceutical art, for example, talc kaolin or terra alba, or a mixture thereof, which material prevents the cores from sticking together and gives the surface of the cores a slightly rough finish which assists in the subsequent manufacture of the sustained release pellets. The cores may be recovered from the powdered material by, for example, sieving and the resulting powder can be reused.

The heat for the heatng zone may be supplied by any suitable conventional means, for example, by combustion of coal gas or of a gas/air mixture.

The fusible substance employed in the method of the invention will generally be sugar, advantageously in granulated form, but other suitable substances may also be employed and in some cases the medicament itself may be used as the fusible substance.

In a preferred embodiment of the invention, droplets of fused sugar are formed by causing a stream of crystals of granulated sugar to fall under gravity through a heating zone in order to heat the crystals sufficiently to cause them to melt and take up a substantially spherical form. Advantageously the sugar crystals are sieved before being passed through the heating zone so that droplets of a desired substantially uniform size may be formed. In this manner it is possible to produce solidified sugar cores all of the required size, whereas by the standard procedure a percentage of undersized and oversized sugar cores are inevitably produced. Furthermore, since the sugar cores are substantially spherical, the actual size of the coated pellets produced from them may be more accurately controlled which in turn beneficially assists in the blending of the various groups of pellets and leads to a more accurate medicament content per dosage unit.

It will be appreciated that the process of the invention lends itself especially to a continuous operation, although of course, the process can also be effected in a batchwise manner.

An apparatus suitable for carrying out the process of the invention comprises a heating means adapted to allow small droplets of a fused substance to fall therefrom under gravity, means for feeding said substance to the heating means, and means for collecting solidified substantially spherical cores formed by cooling of the fused droplets falling from the heating zone.

Such an apparatus is illustrated schematically in the accompanying drawing. It is to be understood, however, that this invetnion is not limited to the apparatus as shown.

Referring to the drawing apparatus 2 in accordance with this invention is provided with a hopper 4 for fusible material 5 discharging into a vibratory feed trough 6 which in turn discharges the material above a heater 8 having a substantially vertically disposed passageway through which the material 5 drops to form fused droplets. A second vibratory trough 10 having a sieve 12 and discharging into container 13 is positioned below heater 8 to collect the solidified substantially spherical cores formed by cooling of the fused droplets falling from the heater 8.

For the introduction of the nontoxic powdered material used to prevent sticking of the cores there is provided a powder hopper 14 having its discharge end 16 positioned above the upper end of vibratory trough 10. A powder recycling unit 18 is provided for the excess inert powder which is sieved through 12 and returned to powder hopper 14 where it can be reused. Unit 18 has a hopper 20 under opening 21 in trough 10 which discharges into conduit 22 connected to the inlet of powder pump 24 which discharges into conduit 26 which in turn discharges into hopper 14.

The invention will now be described in more detail, by way of example, by reference to a specific embodiment thereof.

Into a hopper 4 is fed granulated sugar 5 which has been sieved to obtain crystals of between 20 to 30 mesh, i.e., crystals having a diameter of from about 0.020 to about 0.035 inch. If desired the supply hopper 4 may be heated in order to preheat the granulated sugar 5 before they are subjected to heater 8. The granulated sugar 5 is fed from the hopper onto a vibratory trough 6, from which it is allowed to fall under gravity through a heating device 8 in which the heat is produced by burning coal gas. The heating device has a vertically disposed passageway through which the granulated sugar falls, so that the sugar crystals are caused to melt and take up a substantially spherical form. The sugar spheres formed in this manner fall from the lower end of said passageway and are allowed to continue to fall through air at a temperature lower than the solidification temperature of the melted spheres, preferably at room temperature, for a distance sufficient to allow the sugar spheres to cool and hence solidify. The solidified sugar spheres are collected on a vibratory trough 10 containing a shallow bed of a finely-powdered mixture of talc, kaolin and terra alba (1:1:7 by weight), which prevents the sugar spheres sticking together and gives them a rough finish which is advantageous in subsequent processing. The vibratory trough is fitted with a sieve 12 so that the sugar spheres can be separated from the powder which passes through the sieve and is returned via a powder recycling unit 18 to a hopper 14 and once again to the trough 10 so that the process may be carried out in a continuous manner.

The apparatus employed in the foregoing specific embodiment is illustrated diagrammatically in the accompanying drawing.

I claim:
1. The method of preparing spherical cores suitable for use in the manufacture of sustained release pellets which comprises:
   (a) dropping discrete granules of a fusible substance through a heating zone to melt the granules and form discrete, fused droplets therefrom;
   (b) dropping the melted substance from the heating zone through air at a temperature lower than the solidification temperature of said melted substance to congeal the melted substance as solidified substantially spherical cores; and
   (c) collecting said solidified spherical cores.
2. The method of preparing spherical cores suitable for use in the manufacture of sustained release pellets which comprises:
   (a) dropping discrete granules of granulated sugar particles through a heating zone to melt the granules and form discrete, fused droplets therefrom;
   (b) dropping the melted sugar from the heating zone through air at a temperature lower than the solidification temperature of said melted sugar to congeal the melted sugar as solidified substantially spherical cores; and
   (c) collecting said solidified spherical cores.
3. The method of preparing spherical cores suitable for use in the manufacture of sustained release pellets which comprises:
   (a) dropping discrete granules of granulated sugar particles through a heating zone to melt the granules and form discrete, fused droplets therefrom;
   (b) dropping the melted sugar from the heating zone through air at a temperature lower than the solidification temperature of said melted sugar to congeal the melted sugar as solidified substantially spherical cores;
   (c) collecting said solidified cores on a bed of inert nontoxic powdered material; and
   (d) separating the cores from the inert powdered material.
4. The method of claim 2 wherein the granulated sugar particles are preheated before dropping through the heating zone.
5. The method of claim 3 wherein the inert nontoxic powdered material is selected from the group consisting of talc, kaolin and terra alba.
6. The method of claim 3 wherein the granulated sugar particles are preheated before dropping through the heating zone.

References Cited

UNITED STATES PATENTS

| | | | |
|---|---|---|---|
| 618,428 | 1/1899 | Morrison et al. | 107—8 |
| 2,786,772 | 3/1957 | Stewart et al. | |
| 3,080,292 | 3/1963 | Koff | 264—13 |
| 2,714,224 | 8/1955 | Schaub | 18—2 |
| 2,825,642 | 3/1958 | Eaton et al. | 18—2 X |
| 3,274,642 | 9/1966 | Cramer | 18—2 |

WALTER A. SCHEEL, *Primary Examiner.*

J. SHEA, *Assistant Examiner.*